US 6,617,392 B2

(12) United States Patent
Yang

(10) Patent No.: US 6,617,392 B2
(45) Date of Patent: Sep. 9, 2003

(54) MOLDING COMPOSITION OF SILOXANE CAPABLE OF EXTENDING MOLD LIFETIME

(76) Inventor: Wen-Chen Yang, No. 167, Pei Shing Street, Chia Yi (TW)

( * ) Notice: Subject to any disclaimer, the term of this patent is extended or adjusted under 35 U.S.C. 154(b) by 0 days.

(21) Appl. No.: 10/033,937

(22) Filed: Jan. 3, 2002

(65) Prior Publication Data

US 2002/0086943 A1 Jul. 4, 2002

Related U.S. Application Data

(63) Continuation-in-part of application No. 09/427,724, filed on Oct. 27, 1999, now abandoned.

(51) Int. Cl.$^7$ ................................................ C08L 83/06
(52) U.S. Cl. ...................... 524/588; 525/477; 568/18; 568/21; 524/180; 524/492
(58) Field of Search ................... 525/477; 524/588, 524/180, 412; 568/18, 21

(56) References Cited

U.S. PATENT DOCUMENTS 5,196,477 A * 3/1993 Arai et al.
5,977,249 A * 11/1999 Kovar et al.
6,010,646 A * 1/2000 Schleifstein

* cited by examiner

*Primary Examiner*—Robert Dawson
*Assistant Examiner*—Kwo-Liang Peng
(74) *Attorney, Agent, or Firm*—Rosenberg, Klein & Lee

(57) ABSTRACT

The present invention provides the molding composition of siloxane, which is capable of extending mold lifetime where inhibitors alkene or acetylene polymerization are mixed in the molds composed of siloxane. The inhibitors can effectively inhibit the release of alkene or acetylene when a resin containing an alkene or acetylene is poured into the molds which extends lifetime of molds composed of siloxane. The inhibitors are compounds containing primarily sulfur, wherein sulfur is the most effective.

3 Claims, No Drawings

MOLDING COMPOSITION OF SILOXANE CAPABLE OF EXTENDING MOLD LIFETIME

CROSS-REFERENCE TO RELATED PATENT APPLICATION

The present Application is a Continuation-in-Part Patent Application of patent application Ser. No. 09/427,724, filed Oct. 27, 1999, entitled "The Molding Composition of Siloxane Capable of Extending Mold Lifetime," now abandoned.

BACKGROUND OF THE INVENTION

The present invention provides a molding composition of siloxane which is capable of extending mold lifetime that can be realized by adding alkene or acetylene polymerization inhibitors into molds composed of siloxane and are especially indicated in this invention.

The process of making molds (caves) by using solidificable composition of siloxane is primarily done by pouring the composition around objects which will be released and removed after the composition of siloxane solidify, then followed by emptying the caves where the objects were placed before are formed. The glassy or solid molded products will be obtained after the molded material, such as a liquid or resin with a solidifying agent, is added into the caves. The molded material most often used is a polymerizable liquid such as a polyester-styrene resin (unsaturated polyester resin) which will polymerize and solidify after it is injected into the mold caves composed of siloxane. However, since this process (especially for the alkene resin) is exothermic (sometimes highly exothermic reaction), the molds will be damaged after it is reused.

Damage to the molds may occur for several reasons. Some of the more common ways in which the molds are damage occurs where:

1. A part of a solidified composition of siloxane molds adhere to the molded material. The molds composed of siloxane are damaged by the pulling when the molded material is taken out. This is especially true for molds containing juts or fine stripes.
2. The contacting surface of molds composed of solidified siloxane hardens after being reused several times. The molds are ripped and spoiled because the surface lacks softness and elasticity.

Chemical analysis of damaged molds provides the basic explanation for the damage, that is, both of the mixture components such as a polyester resin and styrene, which is usually used as the molding resin to siloxane molds, can permeate into the siloxane molds. Meanwhile, the solidifying catalyst used in unsaturated polyester resins can also permeate into the siloxane molds, which therefore causes polymerization of polymerizable subjects entering into the siloxane molds and generating a crossing net of polystyrene and organic polysiloxane to harden mold surfaces.

To improve and modify the disadvantages of molds composed of siloxane aforementioned, the subject invention the composition of siloxane molds to extend the lifetime by means of dedications in work, professional knowledge, and experiences in design and manufacture.

DESCRIPTION OF THE PRIOR ART

Various types of organopolysiloxanes and silicone compositions have been provided in prior art. For example, U.S. Pat. No. 5,977,249 to Kovar et al., and U.S. Pat. No. 5,196,477 to Arai et al. are illustrative of such prior art. While these units may be suitable for the particular purpose to which they address, they would not be suitable for the purposes of the present invention as heretofore described.

The Kovar Patent relates to compositions which cross link to provide elastomers or polymers with elastic properties. The compositions are transparent and possess a low compression set. The disclosure describes a silicone rubber composition comprising a polyorganosiloxane with at least two alkenyl groups per molecule and a polyorganosiloxane with at least two silicone-bonded hydrogen atoms, an organic sulfur component, and a metallic catalyst.

The Arai Patent discloses a silicone composition comprising a vinyl end-capped polydiogranosiloxane, a linear organohydrogenpolysiloxane having at least two Si—H groups, sulfides and fillers. The organopolysiloxane composition is adapted for use as insulating materials for electric and electronic parts in order to prevent contact failure.

The above mentioned compositions have the disadvantage that they do not provide the compositions which are capable of extending the lifetime of molds composed of siloxane.

SUMMARY OF THE INVENTION

The main object of this invention is to provide the molding composition of siloxane which is capable of extending mold lifetime where inhibitors alkene or acetylene polymerization are mixed in the molds composed of siloxane. The inhibitors can effectively inhibit the release of alkene or acetylene when a resin containing an alkene or acetylene is poured into the molds. This method extends the lifetime of molds composed of siloxane. The inhibitors are compounds primarily containing sulfur, wherein sulfur is the most effective.

DETAILED DESCRIPTION OF THE PREFERRED EMBODIMENTS

The details of technology and performances of the present invention are as follows.

The composition of siloxane used in making molds to extend life cycle in this invention includes;

1. 1~70 wt %, preferably 5~50 wt % of polydimethylsiloxane ended with trimethylsiloxyl with viscosity of 100~1,000 cps at 25° C.
2. 5~95 wt %, preferably 15~80 wt % of polydimethylsiloxane ended with hydroxyl group with viscosity of 5,000~100,000 cps at 25° C.
3. 1~70 wt %, preferably 5~60 wt % of reinforced or non-reinforced packing material.
4. 1~40 wt %, preferably 3~30 wt % of surface treatment agent of packing powder.
5. 0.00001~15 wt %, preferably 0.01~10 wt % of alkene or acetylene polymerization inhibitors selected from the followings.
   (1) Sulfur (S)
   (2) Disulfides
      R'—S—S—R": for example,
      Dibenzyl disulfide [$C_6H_5CH_2SSCH_2C_6H_5$], dioctyl disulfide, di-tert-pentyl disulfide [$CH_3CH_2C(CH_3)_2SSC(CH_3)_2CH_2CH_3$], di-tert-butyl disulfide [$C(CH_3)_3SSC(CH_3)_3$], etc.
   (3) Organic tin containing sulfur
      ① [$R_2SnS$]$_3$: for example, dibutyltin sulfide [$(C_4H_9)_2SnS$]$_3$, etc.
      ② R'$_2$Sn(SR")$_2$: for example, dibutyltin bis(lauryl) mercaptide [$(C_4H_9)_2Sn(SC_{12}H_{25})$ 2], etc.

Wherein R, R', R", as above are one-valence alkyl with 1~40 carbons in straight chains or branches.

Furthermore, the optimal embodiment of this invention throughout several experiments by the inventor is Composition A containing:

1. 34 wt % of polydimethylsiloxane ended with trimethylsioxyl with viscosity of 100~1,000 cps at 25° C.
2. 30 wt % of polydimethylsiloxane ended with hydroxyl group with viscosity of 5,000~100,000 cps at 25° C.
3. 30 wt % of precipitated silicone dioxide with surface area of 50~250 $m^2/g$.
4. 6 wt % of hexamethyldisilazane.

The total weight above is about 100 wt % and other additional agent such as pigment is added.

The hardening agent used in condensation and solidification of siloxane composition is defined as follows.

1. 34 wt % of condensed ethyl silicate
2. 17 wt % of dibutyltin dilaurate
3. 49 wt % of ISOPAR M an isoparaffinic solvent manufactured by Exxon Company The table as below indicates lifetime of molds composed of siloxane when different inhibitors (such as sulfur, zinc sulfide, silyl mercaptan) were added in different weights.

| Composition A | Composition A Hardening Agent | Inhibitor | Average wt % of Inhibitors | Weight of Polymer Resin[a] Added in Silicone Molds | Life time of Molds[b] (Times of Molding) |
|---|---|---|---|---|---|
| 100 | 3 | no | 0.00 | 95 g | 22 |
| 100 | 3 | sulfur | 0.10 | 95 g | 98 |
| 100 | 3 | sulfur | 0.15 | 95 g | >150 |
| 100 | 3 | zinc sulfide | 1.50 | 95 g | 37 |
| 100 | 3 | silyl mercaptan | 1.00 | 95 g | 53 |
| 100 | 3 | dibenzyl disulfide | 1.00 | 95 g | >100 |
| 100 | 3 | dihexyl disulfide | 1.00 | 95 g | >100 |

Note

[a]Eternal Chemical Co., Ltd. 2126AP as unsaturated polyester resin and methyl ethyl ketone peroxide (MEKPO) as hardening agent of resin were experimented. The resident time for reaction and solidification after each injecting into molds is 30 minutes.

[b]Lifetime of molds: surface of silicone mold hardens and is unusable because of ripping.

These results indicated that the life times of molds could be increased at least 25% or even as high as 100~700% when 0.00001~15 wt % of polymerization inhibitors were added. By using siloxane composition containing polymerization inhibitors, the amount of molding products increase and the cost reduce as well. Therefore, it is quite worthy of commercialization.

What is claimed is:

1. A curable silicone composition for making molds hardened using a hardening agent, comprising:
   a. trimethylsiloxyl end blocked polydimethylsiloxane having a viscosity of 100–1,000 cps at 25° C.;
   b. hydroxyl group end blocked polydimethylsiloxane having a viscosity of 5,000–100,000 cps at 25° C.;
   c. a filler;
   d. a surface treatment agent of the filler; and,
   e. an alkene or acetylene polymerization inhibitor selected from the group consisting of:
      (i) sulfur;
      (ii) disulfides having a formula R'—S—S—R", where R' and R" are each independently selected from a group of monovalent hydrocarbon radicals having from one to forty carbon atoms;
      (iii) organic tin containing sulfur having a formula $[R_2SnS]_3$, where R is selected from a group of monovalent hydrocarbon radicals having from one to forty carbon atoms; and
      (iv) organic tin containing sulfur having a formula $R_2'Sn(SR")_2$ where R' and R" are each independently selected from a group of monovalent hydrocarbon radicals having from one to forty carbon atoms.

2. A curable silicone composition for making molds hardened using a hardening agent, comprising:
   a. trimethylsiloxyl end blocked polydimethylsiloxane having a viscosity of 100–1,000 cps at 25° C.;
   b. hydroxyl group end blocked polydimethylsiloxane having a viscosity of 5,000–100,000 cps at 25° C.;
   c. precipitated silicone dioxide having a surface area of 50–250 $m^2/g$;
   d. hexamethyldisilazane; and
   e. an alkene or acetylene polymerization inhibitor selected from the group consisting of;
      (i) sulfur;
      (ii) disulfides having a formula R'—S—S—R", where R' and R" are each independently selected from a group of monovalent hydrocarbon radicals having from one to forty carbon atoms;
      (iii) organic tin containing sulfur having a formula $[R_2SnS]_3$; where R is selected from a group of monovalent hydrocarbon radicals having from one to forty carbon atoms; and
      (iv) organic tin containing sulfur having a formula $R_2'Sn(SR")_2$, where R' and R" are each independently selected from a group of monovalent hydrocarbon radicals having from one to forty carbon atoms.

3. A composition for making molds to which a hardening agent is added, the composition being formed by a process comprising the steps of:
   a. preparing a curable silicone composition by combining trimethylsiloxyl end blocked polydimethylsiloxane having a viscosity of 100–1,000 cps at 25° C., hydroxyl group end blocked polydimethylsiloxane having a viscosity of 5,000–100,000 cps at 25° C., hydroxyl group end blocked polydimethylsiloxane, and a filler; and,
   b. adding to said curable silicone composition an alkene or acetylene polymerization inhibitor selected from the group consisting of;
      (i) sulfur;
      (ii) disulfides having a formula R'—S—S—R", where R' and R" are each independently selected from a group of monovalent hydrocarbon radicals having from one to forty carbon atoms;
      (iii) organic tin containing sulfur having a formula $[R_2SnS]_3$, where R is selected from a group of monovalent hydrocarbon radicals having from one to forty carbon atoms; and
      (iv) organic tin containing sulfur having a formula $R_2'Sn(SR")_2$, where R' and R" are each independently selected from a group of monovalent hydrocarbon radicals having from one to forty carbon atoms.

* * * * *